United States Patent
Yamamoto et al.

(10) Patent No.: US 12,114,069 B2
(45) Date of Patent: Oct. 8, 2024

(54) IMAGE SENSOR HAVING PUPIL-DIVISION FUCTION CONFIGURED TO OUTPUT PHASE-DIFFERENCE SIGNALS IN HORIZONTAL AND VERTICAL DIRECTIONS FROM DIFFERENT PIXEL GROUPS AND IMAGE CAPTURING APPARATUS

(71) Applicant: CANON KABUSHIKI KAISHA, Tokyo (JP)

(72) Inventors: Daiki Yamamoto, Tokyo (JP); Tomonaga Iwahara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 18/063,195

(22) Filed: Dec. 8, 2022

(65) Prior Publication Data

US 2023/0188847 A1    Jun. 15, 2023

(30) Foreign Application Priority Data

Dec. 15, 2021   (JP) ................................. 2021-203606

(51) Int. Cl.
*H04N 23/67* (2023.01)
*H04N 25/767* (2023.01)
*H04N 25/78* (2023.01)

(52) U.S. Cl.
CPC ......... *H04N 23/672* (2023.01); *H04N 25/767* (2023.01); *H04N 25/78* (2023.01)

(58) Field of Classification Search
CPC .. H04N 25/767; H04N 25/134; H04N 23/672; H04N 25/704; H04N 25/78
See application file for complete search history.

(56) References Cited

U.S. PATENT DOCUMENTS

2010/0091161 A1\* 4/2010 Suzuki ................. H04N 25/134
                                                     348/E5.091
2020/0194484 A1\* 6/2020 Miura .................... H04N 25/46

FOREIGN PATENT DOCUMENTS

JP          2013-106194 A      5/2013
JP          2014-157338 A      8/2014

\* cited by examiner

*Primary Examiner* — Nicholas G Giles
(74) *Attorney, Agent, or Firm* — Cowan, Liebowitz & Latman, P.C.

(57) ABSTRACT

An image sensor comprises a pixel array in which pixels are arranged in a matrix form, and phase-difference signals in a horizontal direction are output from a first pixel group of the pixel array via a first signal output line, and phase-difference signals in a vertical direction are output from a second pixel group, which is different from the first pixel group of the pixel array, via a second signal output line, and number of pixels of the phase-difference signals in the horizontal direction output via the first signal output line and number of pixels of the phase-difference signals in the vertical direction output via the second signal output line are different.

13 Claims, 10 Drawing Sheets

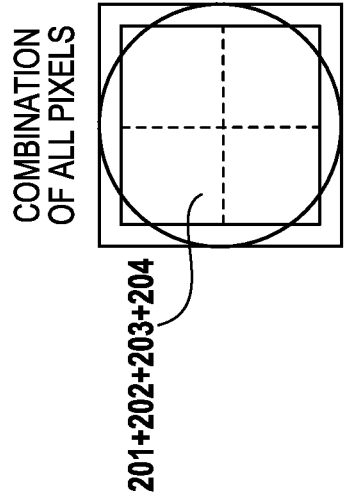
FIG. 2D COMBINATION OF ALL PIXELS
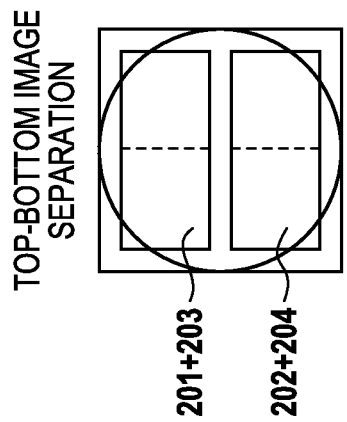
FIG. 2C TOP-BOTTOM IMAGE SEPARATION
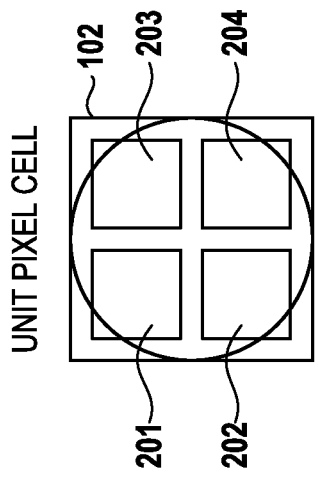
FIG. 2A UNIT PIXEL CELL
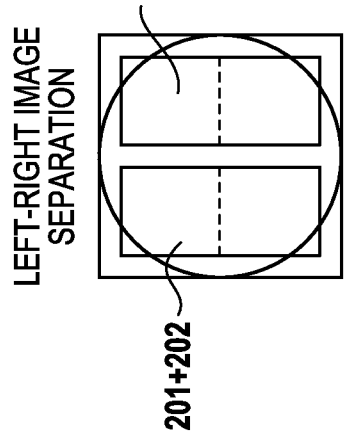
FIG. 2B LEFT-RIGHT IMAGE SEPARATION

IMAGE SENSOR HAVING PUPIL-DIVISION FUCTION CONFIGURED TO OUTPUT PHASE-DIFFERENCE SIGNALS IN HORIZONTAL AND VERTICAL DIRECTIONS FROM DIFFERENT PIXEL GROUPS AND IMAGE CAPTURING APPARATUS

BACKGROUND OF THE INVENTION

Field of the Invention

The present invention relates to an image sensor and an image capturing apparatus.

Description of the Related Art

An image sensor such as a CMOS image sensor is used in an image capturing apparatus such as a digital camera and a video camera.

There is an image sensor having a pupil-division function, and in an image capturing apparatus including such an image sensor, automatic focus adjustment (autofocus) can be performed by detecting a phase difference from a plurality of signals obtained by photoelectrically converting a subject image subjected to pupil-division.

Japanese Patent Laid-Open No. 2013-106194 discloses an image capturing apparatus including an image sensor that is provided with a plurality of photoelectric conversion units with respect to one micro lens. The image capturing apparatus disclosed in Japanese Patent Laid-Open No. 2013-106194 can calculate an amount of focus shift (defocus amount) by generating an A-image signal and a B-image signal from a pupil-divided subject image and performing correlation operation on the generated signals.

Furthermore, Japanese Patent Laid-Open No. 2014-157338 discloses an image capturing apparatus that performs pupil-division not only in a horizontal direction but also in a vertical direction and that detects a phase difference. According to the image capturing apparatus disclosed in Japanese Patent Laid-Open No. 2014-157338, a decrease in focus detection accuracy due to a mismatch between an image separation direction of an image sensor and an image direction (a vertical line or a transverse line) of a subject can be suppressed by switching pupil-division directions at a predetermined period.

As disclosed in Japanese Patent Laid-Open No. 2014-157338, focus detection accuracy decreases in a case where the image separation direction of the image sensor and the image direction of the subject do not match.

Furthermore, in conventional technology disclosed in Japanese Patent Laid-Open No. 2014-157338, when pixel signals are read out from a plurality of pixels arranged in the image sensor, the readout of the pixel signals are sequentially performed in a predetermined direction. In a case where a phase-difference signal, which is pupil-divided in the horizontal direction (row direction), is obtained by sequentially performing readout of pixel signals in row direction, focus detection on a same row can be performed in a readout time required for approximately one row.

On the other hand, in a case where a phase-difference signal, which is pupil-divided in the vertical direction (column direction), is obtained by a method of sequentially performing readout of pixel signals in the row direction, focus detection on a same column cannot be performed until all phase-difference signals of the same column are read out. That is, for the purpose of performing focus detection in the column direction, signals for approximately one frame are required to be read out, and it takes time equivalent to readout time for one frame. Due to this, time that focus adjustment takes differs depending on a scan direction of signal readout and a pupil-division direction of the image sensor.

In addition, a difference ascribable to a pupil-division direction and a signal readout direction in time taken to enable focus detection affects focus detection performance more significantly in a case where a subject is a moving body.

That is, in a case where pupil-division is performed in the horizontal direction (row direction), readout is completed by taking time for approximately one row (several to several tens of microseconds), and thus, even when a subject is a moving body, a subject position shift is small. However, in a case where pupil-division is performed in the vertical direction (column direction), readout takes readout time for approximately one frame (several to several tens of milliseconds), and thus, a subject position shift becomes relatively large, and focus detection performance decreases.

SUMMARY OF THE INVENTION

The present invention has been made in view of the problems described above, and provides an image sensor that can improve focus detection accuracy in a case where focus detection is performed by using an image sensor having a pupil-division function.

According to a first aspect of the present invention, there is provided an image sensor comprising a pixel array in which pixels are arranged in a matrix form, wherein phase-difference signals in a horizontal direction are output from a first pixel group of the pixel array via a first signal output line, and phase-difference signals in a vertical direction are output from a second pixel group, which is different from the first pixel group of the pixel array, via a second signal output line, and number of pixels of the phase-difference signals in the horizontal direction output via the first signal output line and number of pixels of the phase-difference signals in the vertical direction output via the second signal output line are different.

According to a second aspect of the present invention, there is provided an image capturing apparatus comprising: the image sensor described above; and a control circuit configured to perform focus control of a lens based on the phase-difference signals in the horizontal direction or in the vertical direction output from the image sensor.

According to a third aspect of the present invention, there is provided an image sensor comprising a pixel array in which pixels are arranged in a matrix form, wherein phase-difference signals in a horizontal direction are output from a first pixel group of the pixel array via a first signal output line, and phase-difference signals in a vertical direction are output from a second pixel group, which is different from the first pixel group of the pixel array, via a second signal output line, and addition number of pixels of the phase-difference signals in the horizontal direction output via the first signal output line and addition number of pixels of the phase-difference signals in the vertical direction output via the second signal output line are different.

According to a fourth aspect of the present invention, there is provided an image capturing apparatus comprising: the image sensor described above; and a control circuit configured to perform lens focus control, based on the phase-difference signals in the horizontal direction or in the vertical direction output from the image sensor.

Further features of the present invention will become apparent from the following description of exemplary embodiments with reference to the attached drawings.

BRIEF DESCRIPTION OF THE DRAWINGS

FIGS. 2A to 2D are configuration diagrams of pixels in an image sensor.

DESCRIPTION OF THE EMBODIMENTS

Figure 1:
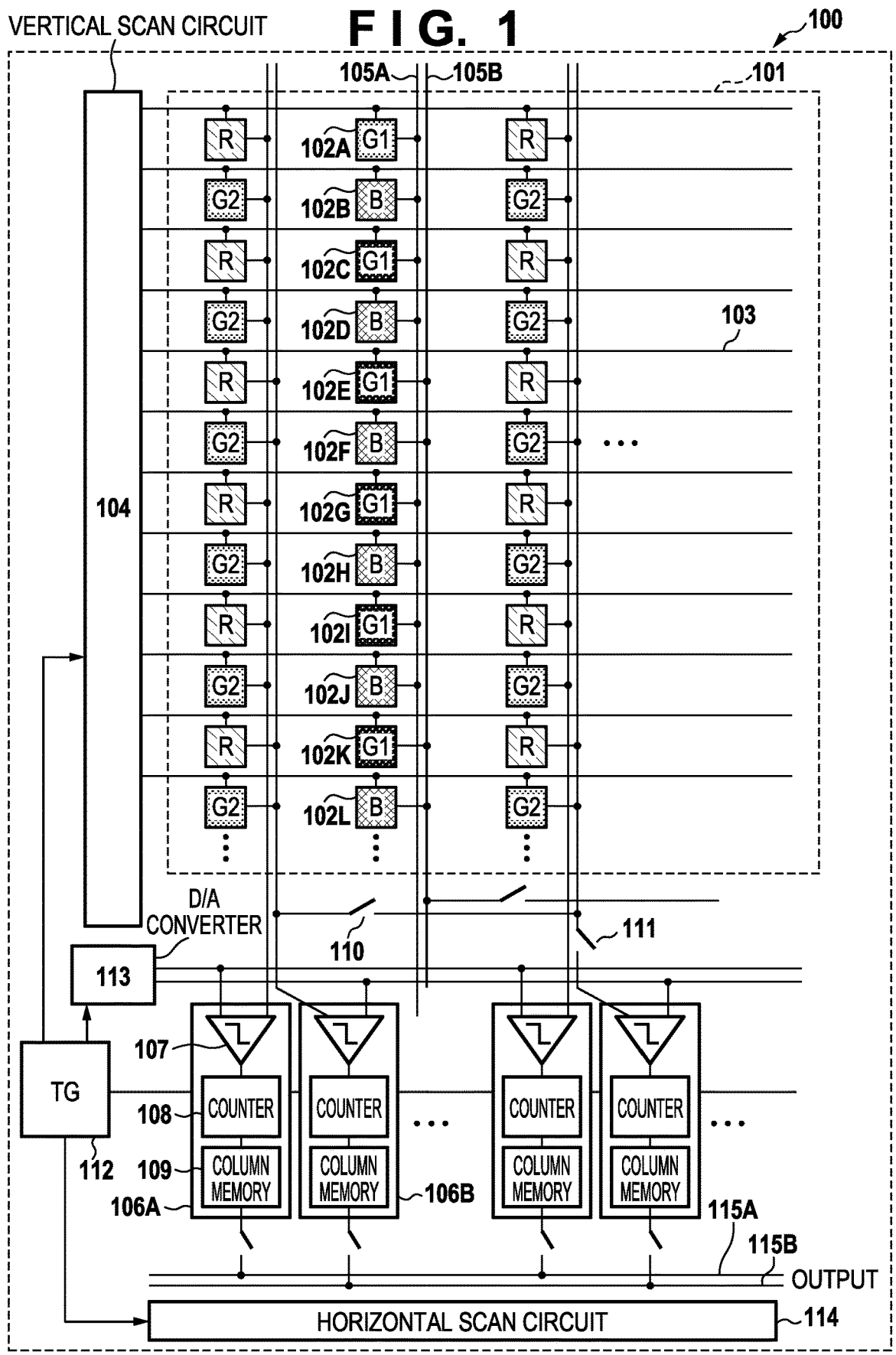
FIG. 1 is a configuration diagram of pixels and peripheral circuits of an image sensor.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration example of pixels and peripheral circuits of an image sensor 100 related to a first embodiment of the present invention.

In FIG. 1, in a pixel portion (pixel array) 101, a plurality of unit pixels 102 are arranged in a matrix form, and a color filter is formed, in each of the unit pixels 102, to be in a so-called Bayer array. Although the present embodiment is explained with an assumption that two column output lines are arranged for each one column of the pixel columns of the pixel array, the number of column output lines is not limited thereto, and any number of column output lines, such as 4, 12 or 20 column output lines, can be arranged in accordance with the required performance.

A unit pixel 102A is connected to a column output line 105A via a selection switch not illustrated, and outputs a pixel signal to a column circuit 106A per each row. In the present embodiment, other unit pixels 102B, 102C, 102D, 102G, 102H, 102I and 102J are connected to the column output line 105A.

A unit pixel 102E is connected to a column output line 105B via a selection switch not illustrated, and outputs a pixel signal to a column circuit 106B per each row. In the present embodiment, other unit pixels 102F, 102K and 102L are connected to the column output line 105B.

Here, the unit pixels 102F and 102K may be configured to be connected to the column output line 105A. In addition, each unit pixel may be provided with a plurality of selection switches so that each unit pixel is connected to both of the column output lines 105A and 105B.

The selection switches not illustrated are switches configured to perform selection control of a unit pixel of a particular row according to a control signal supplied from a vertical scan circuit 104 via a signal line 103, and a scan is performed in the row direction by the vertical scan circuit 104. Switches 110 and 111 are switches configured to perform horizontal addition of pixel signals, and ON/OFF of each of the switches 110 and 111 is controlled by a control signal supplied from a timing generator (TG, below) 112 via a signal line not illustrated.

The TG 112 generates a pulse-like control signal for controlling the vertical scan circuit 104, transistors in the unit pixels 102, the switches 110 and 111 or the like, and also generates a comparison reference signal. In addition, a D/A converter (DAC, below) 113 generates a reference signal (slope signal or ramp signal) that changes in a level over time. The reference signal is input by control of the TG 112 as one of the signals to a comparator 107.

A column circuit 106 of each column is formed of the column circuits 106A and 106B corresponding to the column output lines 105A and 105B.

The column circuit 106 includes the comparator 107, a counter 108, and a column memory 109.

The reference signal generated by the DAC 113 is input to one input of the comparator 107, and the pixel signal output to the column output line 105 is input to the other input of the comparator 107. The comparator 107 compares a potential V of the pixel signal output to the column output line 105 with the reference signal that changes over time.

The counter 108 measures, based on a clock, the time taken until a magnitude relationship between the pixel signal and the reference signal is inverted in the comparator 107, and generates a digital signal based on the time measured. The column memory 109 holds the digital signal generated based on the time measured by the counter 108.

A horizontal scan circuit 114 scans the column circuit 106 in the column direction, and outputs the digital signal held in the column memory 109, via horizontal signal lines 115A and 115B commonly connected to each column. The horizontal scan circuit 114 is also controlled by the TG 112.

FIGS. 2A to 2D are diagrams illustrating a configuration of the unit pixel 102. In FIG. 2A, the unit pixel 102 includes subpixels 201, 202, 203 and 204 each including a photoelectric conversion unit, and the four subpixels share a single micro lens.

As illustrated in FIG. 2B, a signal, which is pupil-divided in a left-right direction (row direction), is obtained by separating and reading out a combined signal of the subpixels 201 and 202 among the four subpixels and a combined signal of the subpixels 203 and 204 among the four subpixels. Furthermore, as illustrated in FIG. 2C, a signal, which is pupil-divided in a top-bottom direction (column direction), is obtained by separating and reading out a composition signal of the subpixels 201 and 203 and a composition signal of the subpixels 202 and 204. Then, as illustrated in FIG. 2D, an image capturing signal is obtained by combining signals of the four subpixels.

The signal, which is pupil-divided in the left-right direction (row direction), is suitable for detection of a subject mainly including a vertical line, and this dividing direction may be referred to as a short grain. The signal, which is pupil-divided in the top-bottom direction (column direction) is suitable for detection of a subject mainly including a transverse line, and this dividing direction may be referred to as a long grain.

Signals based upon photoelectric conversion of the subpixels 201, 202, 203, and 204 will be referred to below as an A signal, a B signal, a C signal, and a D signal, respectively. Furthermore, for instance, a combined signal of the subpixels 201 and 202 will be referred to as an A+B signal.

Figure 3:
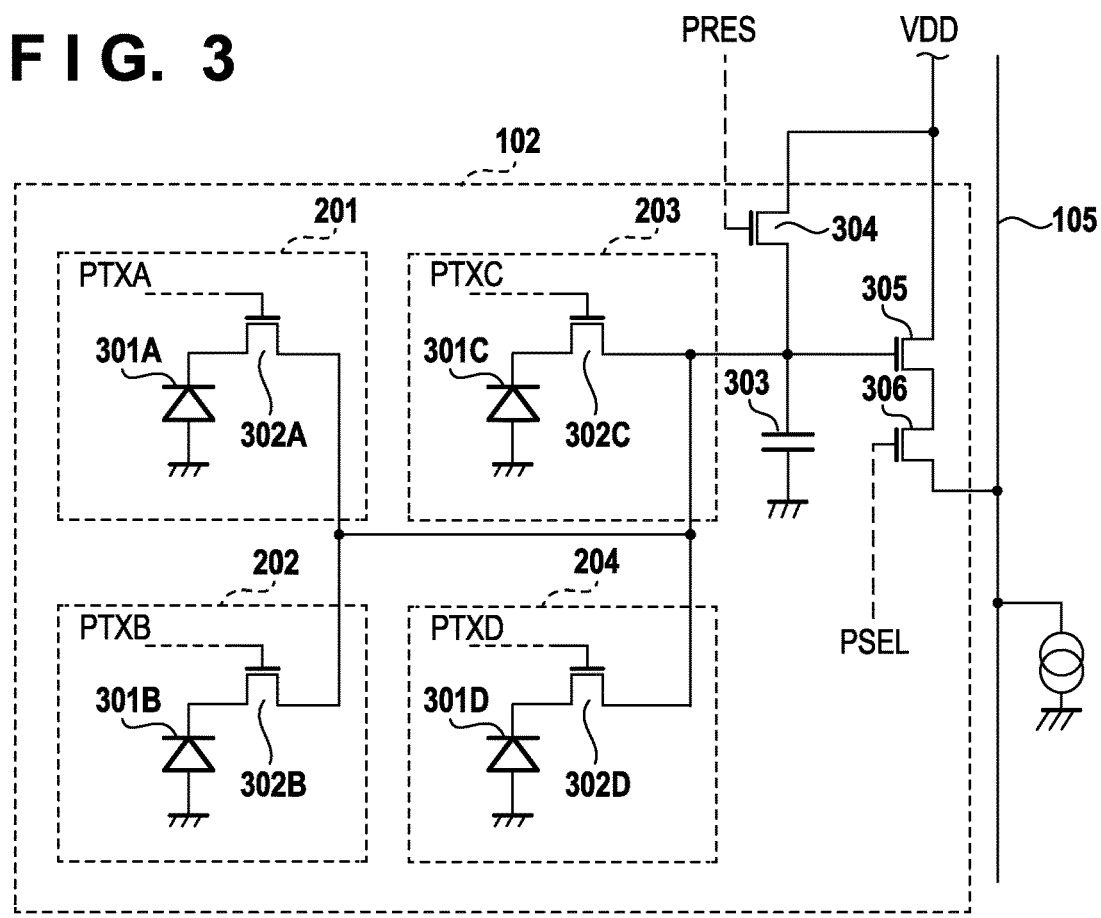
FIG. 3 is a circuit diagram of a pixel in an image sensor.

FIG. 3 is a circuit diagram illustrating an example of a configuration of the unit pixel 102. A photodiode (PD, below) 301A that is a photoelectric conversion unit included in the subpixel 201 is connected to a common floating diffusion (FD, below) 303 via a transfer switch 302A. Here, the transfer switch 302A is controlled by a transfer pulse PTXA output from the vertical scan circuit 104.

The same applies to the subpixels 202, 203, and 204, and PDs 301B, 301C, and 301D of the subpixels 202, 203, and 204 are connected to the common FD 303 via transfer switches 302B, 302C, and 302D, respectively. The transfer switches 302B, 302C, and 302D of the subpixels 202, 203, and 204 are controlled by transfer pulses PTXB, PTXC, and PTXD, respectively.

The FD 303 temporarily accumulates electric charge transferred from the PDs 301A to 301D and converts the electric charge into voltage. A reset switch 304 is controlled by a reset pulse PRES and supplies a reference potential VDD to the FD 303.

A pixel amplifier 305 is a source follower circuit composed of a MOS transistor and a constant current source. A selection switch 306 is controlled by a selection pulse PSEL and outputs potential variation of the pixel amplifier 305 from the column output line 105 to the column circuit 106.

Figure 4:
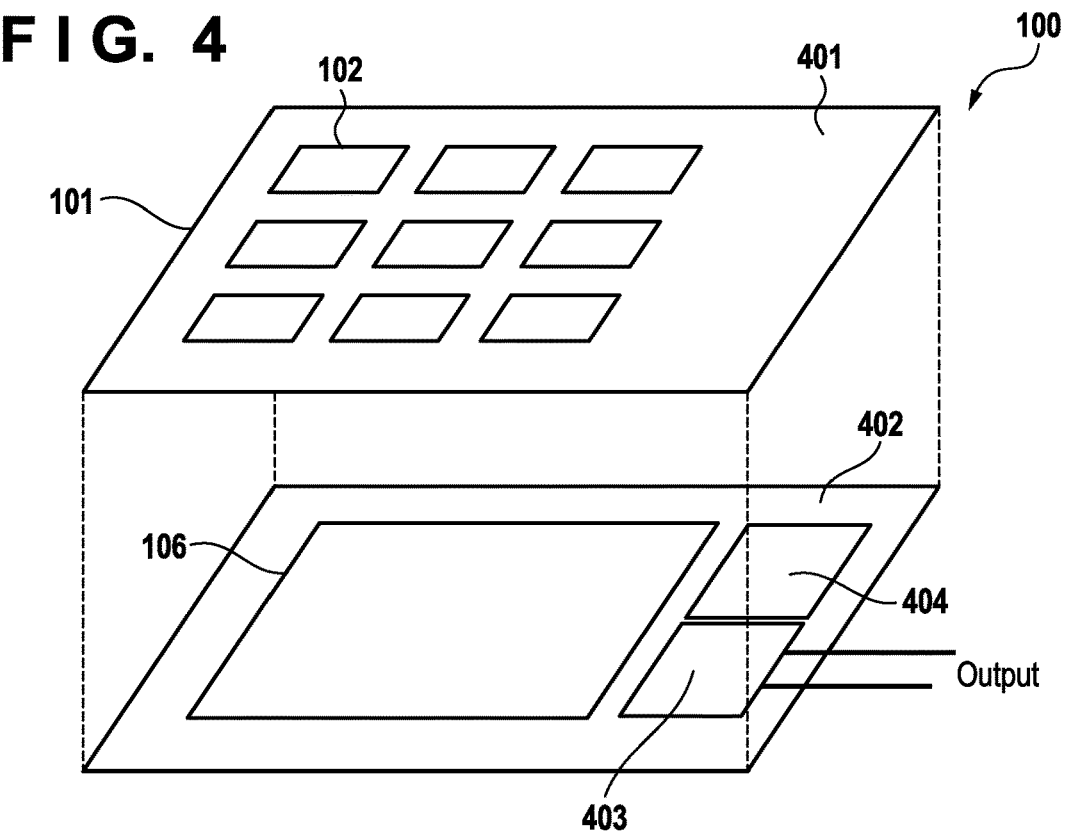
FIG. 4 is a schematic diagram illustrating a stacked structure of an image sensor.

FIG. 4 is a schematic diagram illustrating a structure of an image sensor 100 of the present embodiment. The image sensor 100 is constituted by alternately stacking a first semiconductor substrate 401, having a pixel portion 101 or the like formed thereon, and a second semiconductor substrate 402, having a readout circuit such as the column circuit 106 formed thereon.

The second semiconductor substrate 402 is configured by including the column circuit 106, a data processing circuit 403, and a substrate memory 404. The column circuit 106 is electrically connected to the first semiconductor substrate 401 by a bump or the like. The data processing circuit 403 performs various types of arithmetic operation processing or correction. The substrate memory 404 is a volatile memory such as a DRAM, and used, for instance, for the purpose of temporally holding data when a signal from the column circuit 106 is processed by the data processing circuit 403.

Figure 5:
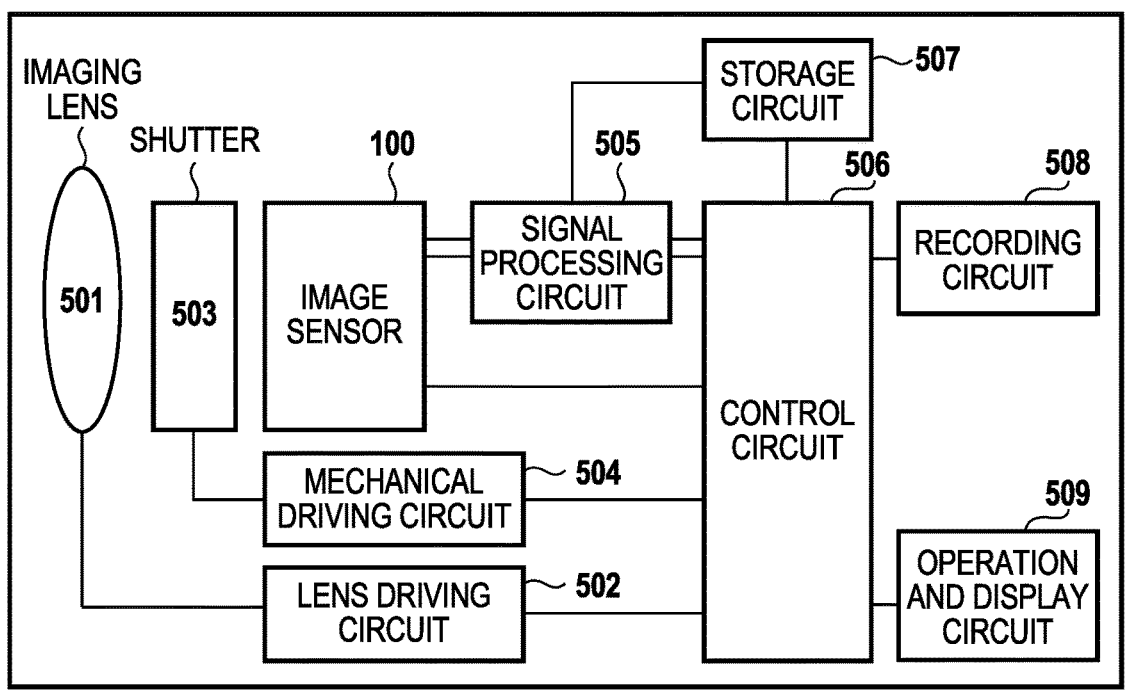
FIG. 5 is a block diagram illustrating a configuration example of an image capturing apparatus.

FIG. 5 is a block diagram illustrating a configuration of an image capturing apparatus 500 of the present embodiment.

Focus control or the like of an imaging lens 501 is performed by a lens driving circuit 502, and the imaging lens 501 forms an optical image of a subject on the image sensor 100.

A shutter 503 that controls an exposure amount is controlled by a mechanical driving circuit 504. The image sensor 100 converts incident light into an electrical signal and outputs the converted signal as an image signal. A signal processing circuit 505 performs various types of arithmetic operation processing such as gain processing, offset correction processing, white balance correction processing or the like with respect to the image signal output from the image sensor 100.

The image sensor 100 and the signal processing circuit 505 are connected by a plurality of signal lines. The image capturing apparatus 500 of the present embodiment is configured such that signals output from the horizontal signal lines 115A and 115B of the image sensor 100 are independently and separately input to the signal processing circuit 505.

A control circuit 506 controls the image capturing apparatus 500 entirely, while performing various types of processing such as driving control of the image sensor 100, an autofocus operation, and shutter control. The signal processing circuit 505 may be incorporated in the control circuit 506.

A storage circuit 507 is a storage memory that holds image data and an offset correction value. The storage circuit 507 is also connected to the signal processing circuit 505. The storage circuit 507 may also be connected to the data processing circuit 403 of the image sensor 100, and may be configured to be able to selectively perform communication of data and a correction value.

A storage circuit 508 that is removable such as a semiconductor memory stores image data. An operation and display circuit 509 receives a user operation and also displays various types of information.

Figure 6:
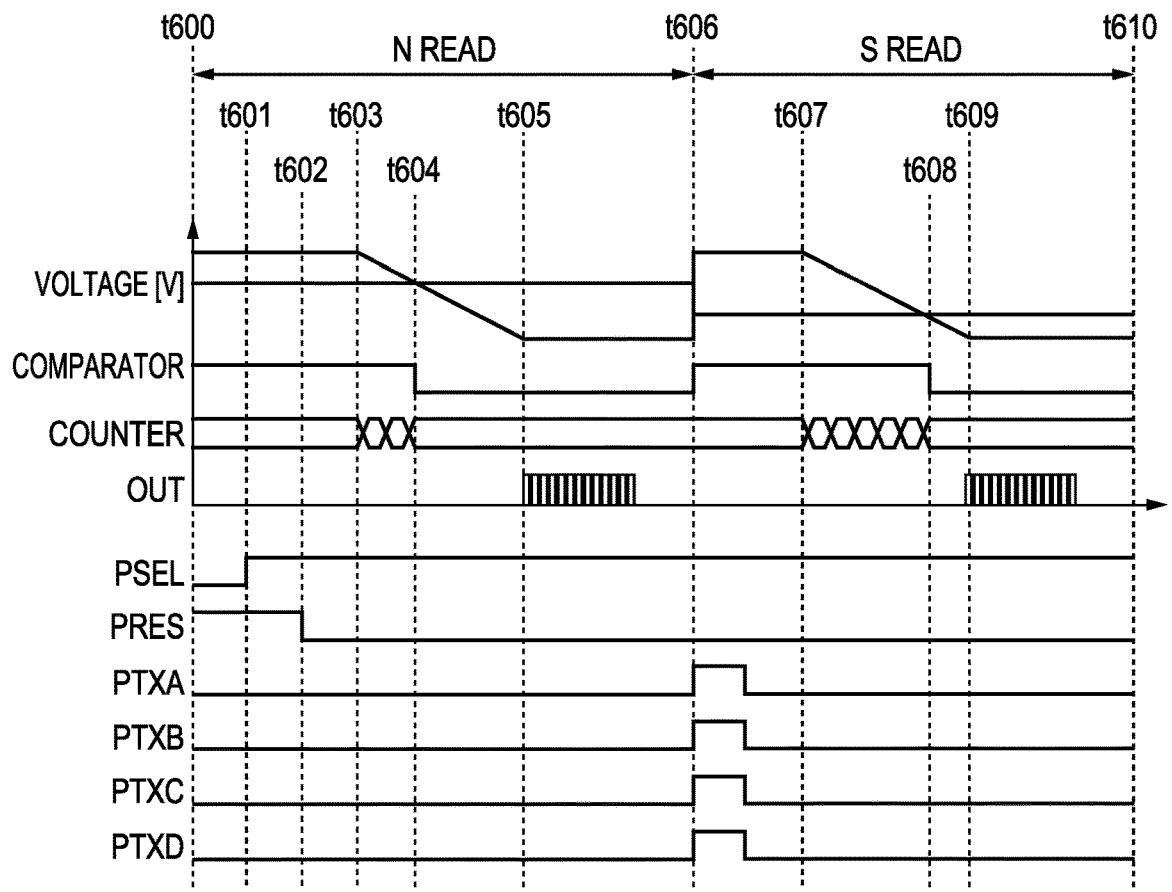
FIG. 6 is a timing chart illustrating a first readout operation.

FIG. 6 is a timing chart illustrating a first readout mode in the present embodiment. FIG. 6 illustrates the case where only an image capturing signal is read out.

It is assumed that the pixel portion 101 is reset by a time point t600, and electric charge accumulation is started. Here, in the reset, the reset pulse PRES set to Hi and the transfer pulse PTX set to Hi, and during electric charge accumulation, the reset pulse PRES is set to Hi and the transfer pulse PTX is set to Lo.

At time t601, the unit pixel 102 of a certain row is connected to the column output line 105 by the selection pulse PSEL.

At time t602, the reset pulse PRES is changed from Hi to Lo, and thus, the potential V (N signal) of the FD 303 obtained after reset-release is input to the comparator 107 via the column output line 105.

At time t603, the DAC 113 starts outputting a reference signal VL that changes like a ramp. At the same time as the DAC 113 starts outputting the reference signal VL, counting by the counter 108 starts.

At time t604, magnitude relationship between an input signal and the reference signal VL is reversed, and thus, an output of the comparator 107 is inverted, and a count value of the counter 108 at that time is held in the column memory 109. Subsequently, after the reference signal VL has transited to reach a predetermined upper limit value at time t605, a signal is output in the horizontal scan circuit 114, and thus, readout of the signal (N signal), which is a signal after reset-release of the pixel 102, is terminated.

At time t606, the transfer pulses PTXA, PTXB, PTXC and PTXD cause the electric charges of the four subpixels 201 to 204 to be transferred to the FD 303 and combined, and the potential V of the column output line 105 becomes a potential according to the pixel signal (A+B+C+D signal). Furthermore, reset of the comparator 107 is performed.

At time t607, the DAC 113 starts outputting the reference signal VL that changes like a ramp. At the same time as the DAC 113 starts outputting the reference signal VL, counting by the counter 108 starts.

At time t608, magnitude relationship between an input signal and the reference signal VL is reversed, and thus, an output of the comparator 107 is inverted, and a count value of the counter 108 at that time is held in the column memory

109. Subsequently, after the reference signal VL has transited to reach a predetermined upper limit value at time t609, a signal is output in the horizontal scan circuit 114, and thus, readout of the signal (A+B+C+D signal) is terminated.

Subsequently, predetermined signal processing such as subtraction of the N signal from the A+B+C+D signal is performed.

The sequence of operations described above are performed independently in the column output lines 105A and 105B, the column circuits 106A and 106B, and the horizontal signal lines 115A and 115B.

Figure 7:
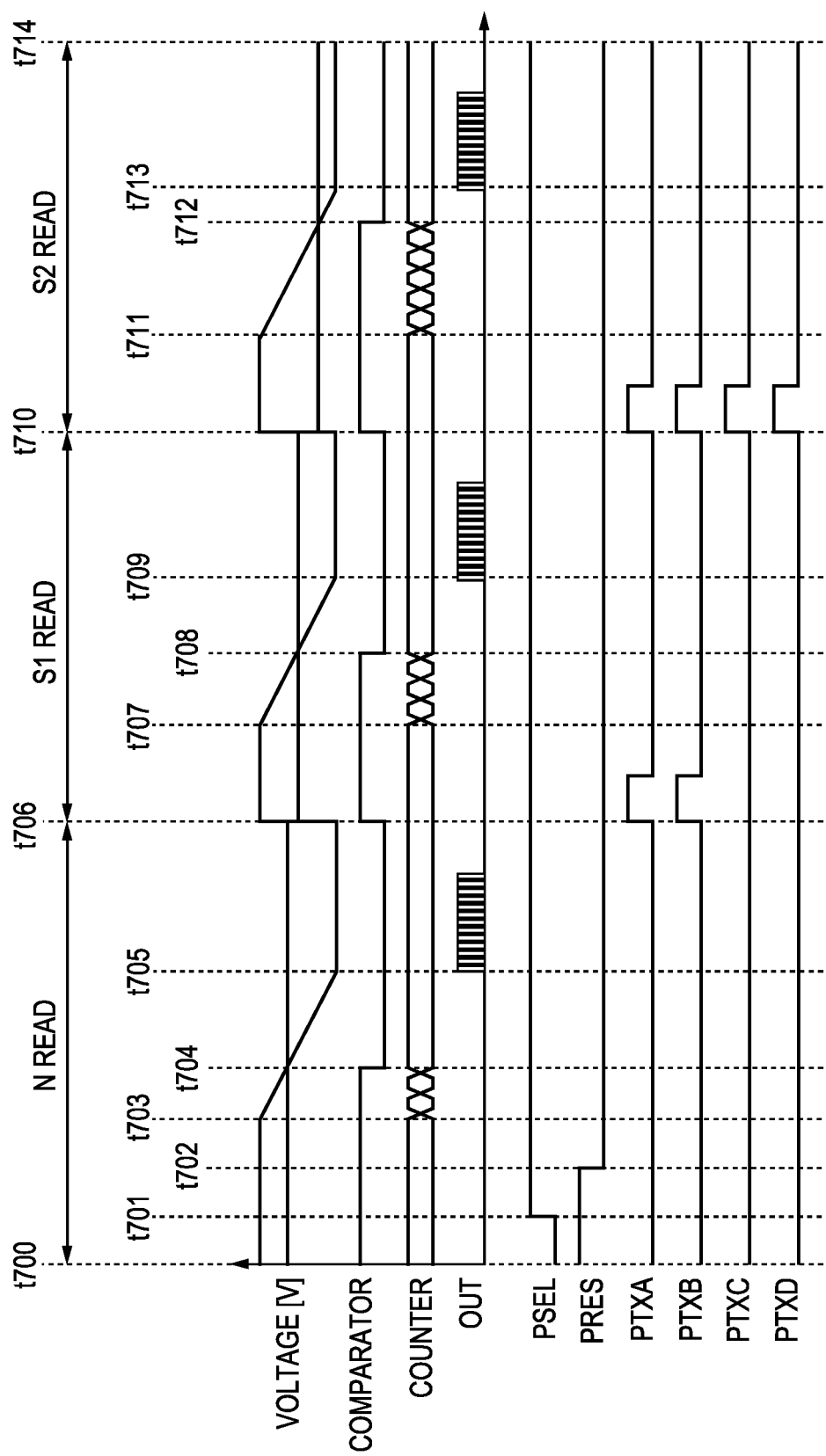
FIG. 7 is a timing chart illustrating a second readout operation.

FIG. 7 is a timing chart illustrating a second readout mode in the present embodiment. FIG. 7 illustrates the case where both an image capturing signal and a phase-difference signal of the left-right direction (horizontal direction) are read out.

Processing until end of readout of the signal (N signal), which is a signal after reset-release at time t705, is the same as that in FIG. 6, and thus, explanation of the processing will be omitted.

At time t706, the transfer pulses PTXA and PTXB cause the electric charges of the subpixels 201 and 202 to be transferred to the FD 303 and combined, and the potential V of the column output line 105 becomes a potential according to the pixel signal (A+B signal). Furthermore, reset of the comparator 107 is performed.

At time t707, the DAC 113 starts outputting the reference signal VL that changes like a ramp. At the same time as the DAC 113 starts outputting the reference signal VL, counting by the counter 108 starts.

At time t708, magnitude relationship between an input signal and the reference signal VL is reversed, and thus, an output of the comparator 107 is inverted, and a count value of the counter 108 at that time is held in the column memory 109. Subsequently, after the reference signal VL has transited to reach a predetermined upper limit value at time t709, a signal is output in the horizontal scan circuit 114, and thus, readout of the pixel signal (A+B signal) of the pixel 102 is terminated.

At time t710, the transfer pulses PTXA, PTXB, PTXC and PTXD cause the electric charges of the subpixels 201 to 204 to be transferred to the FD 303 and combined, and the potential V of the column output line 105 becomes a potential according to the pixel signal (A+B+C+D signal). Furthermore, reset of the comparator 107 is performed.

At time t711, the DAC 113 starts outputting the reference signal VL that changes like a ramp. At the same time as the DAC 113 starts outputting the reference signal VL, counting by the counter 108 starts.

At time t712, magnitude relationship between an input signal and the reference signal VL is reversed, and thus, an output of the comparator 107 is inverted, and a count value of the counter 108 at that time is held in the column memory 109. Subsequently, after the reference signal VL has transited to reach a predetermined upper limit value at time t713, a signal being output in the horizontal scan circuit 114, and thus, readout of the pixel signal (A+B+C+D signal) of the pixel 102 is terminated.

Subsequently, predetermined signal processing such as subtraction of the N signal from the A+B signal and the A+B+C+D signal is performed. Furthermore, a C+D signal is obtained by subtracting the A+B signal from the A+B+C+D signal. An image capturing signal is constituted by the A+B+C+D signal, and a phase-difference signal is constituted by the A+B signal and the C+D signal.

Figure 8:
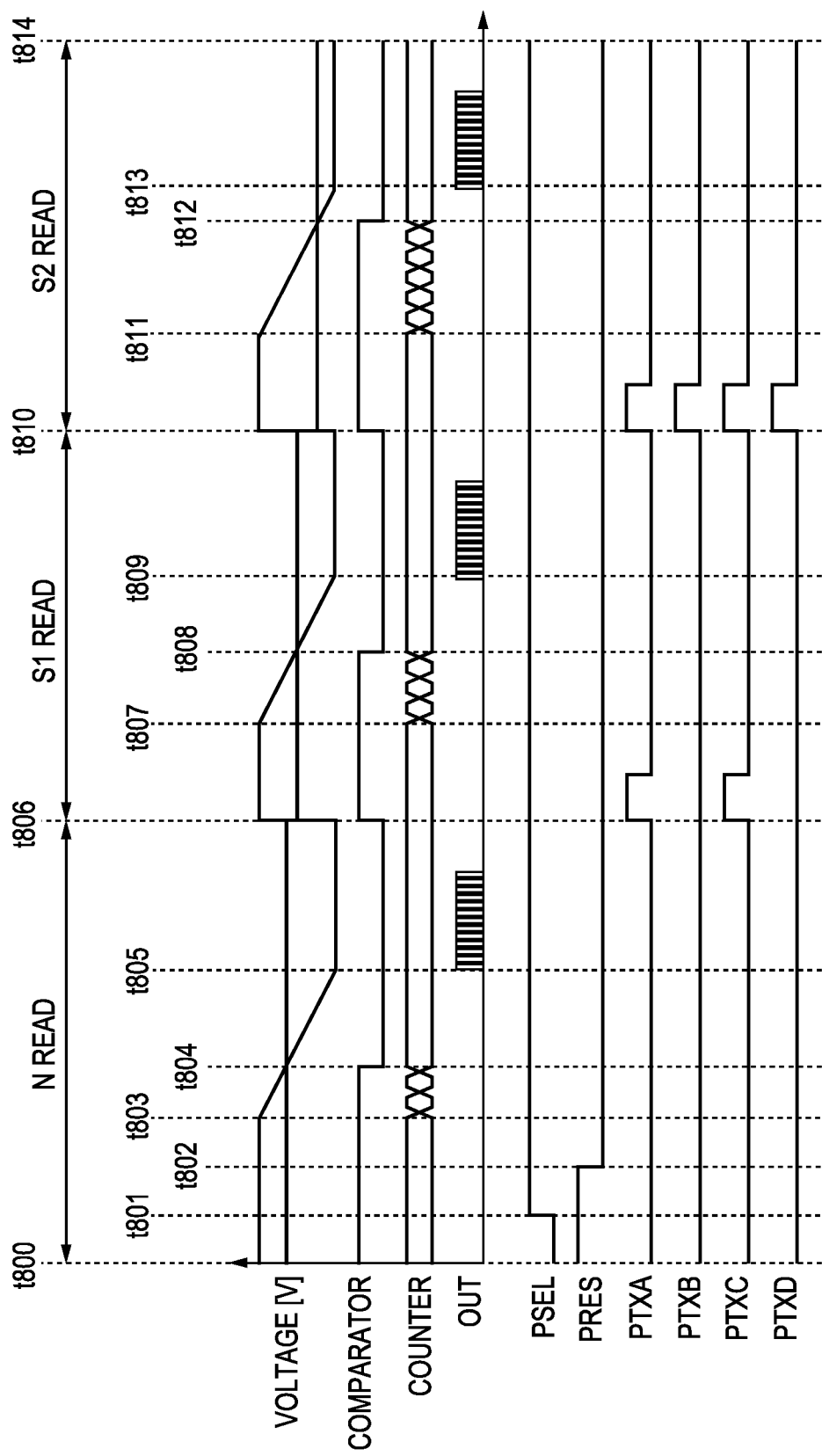
FIG. 8 is a timing chart illustrating a third readout operation.

FIG. 8 is a timing chart illustrating a third readout mode in the present embodiment. FIG. 8 illustrates a case of reading out both an image capturing signal and a phase-difference signal of the top-bottom direction (vertical direction).

To avoid redundancy, explanation of processing similar to that in FIG. 7 will be omitted. A difference from FIG. 7 is that electric charge transfer at time t806 is performed by the transfer pulses PTXA and PTXC. Due to this, electric charge of the subpixels 201 and 203 is transferred to the FD 303, and a pixel signal (A+C signal) of the pixel 102 is read out.

A B+D signal is obtained by subtracting the A+C signal from the A+B+C+D signal. An image capturing signal is constituted by the A+B+C+D signal, and a phase-difference signal is constituted by the A+C signal and the B+D signal.

Among the signals obtained as described above, the image capturing signal is used for live-view display or the like, and the phase-difference signal is used for focus detection or the like. Note that in a case where both the signals are read out, use of both the signals or use of only one of the signals can be selected as appropriate in accordance with an operation mode of the image capturing apparatus.

The horizontal synchronization signal periods in the first to the third readout modes may be set to be identical or different. In other words, the periods from time t600 to time t610 in FIG. 6, the periods from time t700 to time t714 in FIG. 7, and the periods from time t800 to time t814 in FIG. 8 may be respectively set in an arbitrary manner.

Figure 9:
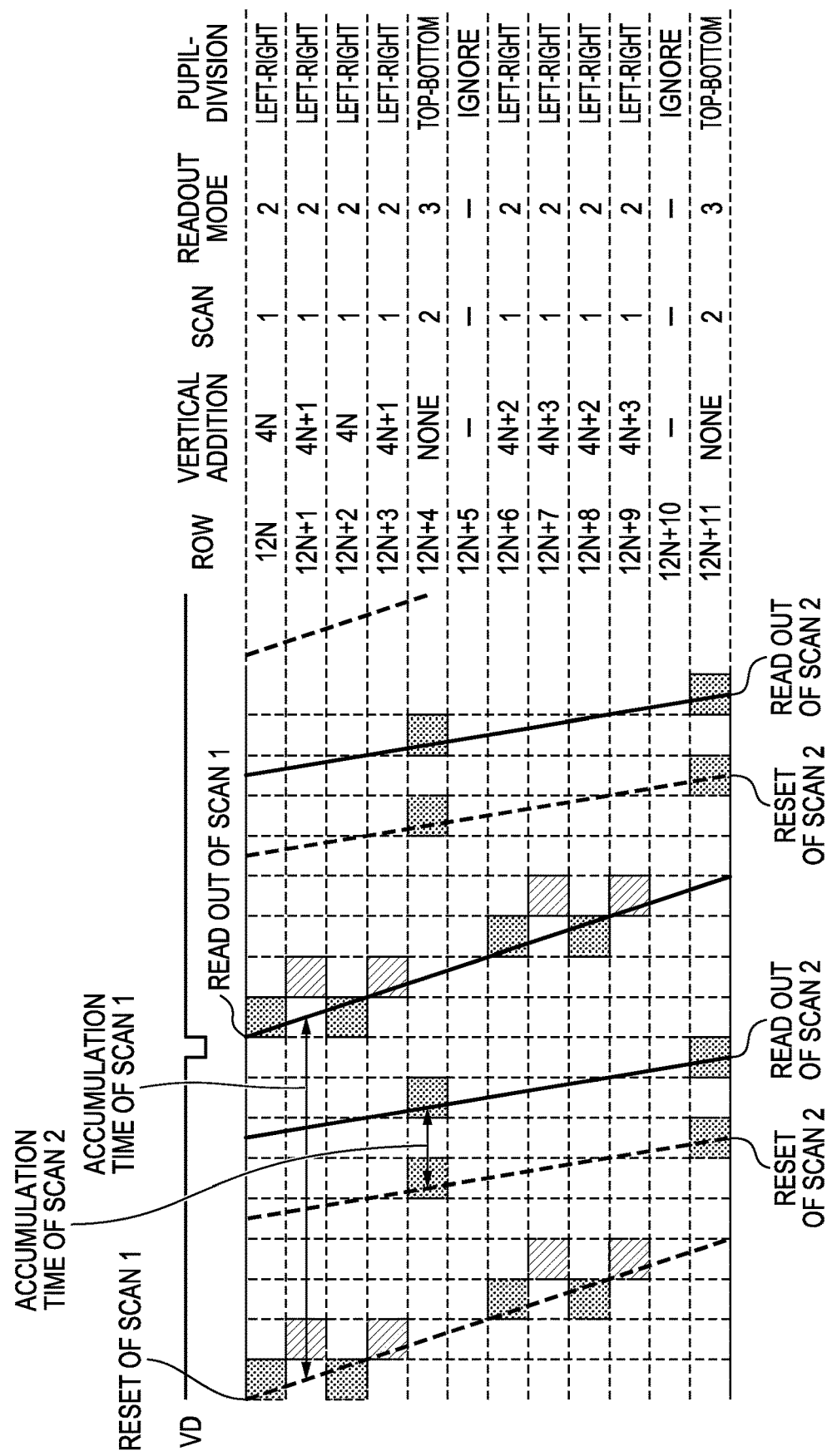
FIG. 9 is a conceptual view illustrating a vertical scan and a pupil-division direction in a first embodiment.

FIG. 9 is a conceptual view explaining a relation between the readout scan and the pupil-division direction in a readout operation of a pixel signal in the present embodiment. In FIG. 9, twelve rows of pixels are illustrated as an example, and the case where a readout scan is sequentially performed in units of row is illustrated.

In FIG. 9, row numbers 12N to 12N+3 and 12N+6 to 12N+9, which indicate rows for obtaining left-right pupil-divided phase-difference signals, are referred to as a first pixel group. Row numbers 12N+4 and 12N+11, which indicate rows for obtaining top-bottom pupil-divided phase-difference signals, are referred to as a second pixel group. Here, in the present embodiment, readout scan is not performed on the row numbers 12N+5 and 12N+10. In addition, N represents a natural number.

In the present embodiment, signals of the first pixel group are read out via the column output line 105A in the second readout mode, and this is expressed as scan 1. Similarly, a second pixel group are read out via the column output line 105B in a third readout mode, which is expressed as scan 2.

In addition, pixel signals of rows having a same number of vertical additions in FIG. 9 indicate that vertical addition will be performed. In other words, signals of pixels of row 12N and row 12N+2 having a number of vertical additions 4N are vertically added. For example, the method of vertical addition includes addition method of signals in the column output line 105A.

Specifically, simultaneously turning ON the selection switch 306 of the pixels of rows 12N and 12N+2 causes the voltage value of each pixel to be simultaneously output to the column output line 105A. As a result, the average value of signals of respective pixels are output to the column circuit 106A. However, the method of vertical addition and the number of pixels to be added (number of additions) are not limited thereto.

In the present embodiment, signals of respective two pixels of other rows 12N+1 and 12N+3 (number of vertical additions 4N+1), rows 12N+6 and 12N+8 (number of vertical additions 4N+2), and rows 12N+7 and 12N+9 (number of vertical additions 4N+3) are added in the vertical direction.

A left figure of FIG. 9 illustrates a so-called slit rolling operation in which image capturing timing is predefined by a vertical synchronization signal (VD). A vertical axis of the figure indicates a row number, and a horizontal axis indicates time. Solid lines represent readout timings of target rows, and broken lines represent reset (start of accumulation of electronic shutter) timings of target rows. The time from the timing of reset operation to the timing of performing readout operation corresponds to the exposure time.

Signal readout in scan 1 starts from the vertical synchronization signal VD. Reset (start of accumulation) in scan 1 is started in a preceding frame. After the start of the signal readout in scan 1, signal readout in scan 2 independently starts within predetermined time. Reset (start of accumulation) in scan 2 can be set at timing and accumulation time that are different from those in scan 1.

For example, in row 12N (row 12N+2) and row 12N+1 (row 12N+3) scanned by scan 1 and row 12N+4 scanned by scan 2, accumulation is performed for different lengths in a same time slot, and signal readout is performed in parallel in different sequences in a same time slot. In addition, whereas scan 1 performs a one-time signal readout during a single VD, scan 2 allows a plurality of signal readouts to be performed during a single VD.

In scan 1, eight out of twelve rows are read out and signals of two pixels are added in the vertical direction, in order to perform live view image capturing and focus detection in the left-right direction by the image sensor 100. Therefore, the number of rows after vertical addition becomes four. On the other hand, two out of twelve rows are read out in scan 2 for focus detection in the top-bottom direction, prioritizing the frame rate.

As described above, in the present embodiment, scan 1 is performed with left-right pupil-division and scan 2 is performed with top-bottom pupil-division, and thus, focus detection can be performed with both the scans.

In scan 1, vertical addition of pixel signals targeting on pixels that are pupil-divided in the left-right direction is performed, and thus, image capturing signals and phase-difference signals can be obtained at a high speed. In addition, since the addition direction of pixel signals is different from the pupil-division direction, it is possible to obtain phase-difference signals while suppressing decrease of focus detection accuracy due to pixel addition. Furthermore, in scan 2, a part of the rows skipped in scan 1 is read out, and the number of readout rows is smaller than scan 1, and thus a phase-difference signal can be obtained at a high speed.

In other words, in scan 1, signals of the first pixel group are read out at a first frame rate. Then, in scan 2, signals of the second pixel group are read out at a second frame rate that is faster than the first frame rate. Accordingly, in scan 2, readout time can be reduced more than the case where a top-bottom phase-difference signal is read out in scan 1 (in this example, the read time is reduced about one fifth), and a decrease in focus detection accuracy due to a high movement speed of the subject can be suppressed.

An image capturing signal and a phase-difference signal read out in each of scan 1 and scan 2 are subjected to predetermined processing such as correction processing and a correlation operation by the signal processing circuit 505 and the control circuit 506. Then, the image capturing signal and the phase-difference signal are used for live view display by the operation and display circuit 509 and used for a focus adjustment operation of the imaging lens 501 via the lens driving circuit 502.

As such, by selectively using the scan for each selected row in accordance with the pupil-division direction for autofocus, even in a case where pupil-division is performed in the vertical direction and even in a case where a subject is moving, a subject position shift can be suppressed and focus detection accuracy can be improved.

Second Embodiment

In the present embodiment, the pixel 102A is connected to the column output line 105A via a selection switch not illustrated, and outputs a pixel signal to the column circuit 106A for each row. It is further assumed in the present embodiment that the pixels 102C, 102D, 102F, 102G, 102I, 102J and 102L are connected to the column output line 105A.

A pixel 102B is connected to a column output line 105B via a selection switch not illustrated, and outputs a pixel signal to a column circuit 106B for each row. It is further assumed in the present embodiment that the pixels 102E, 102H and 102K are connected to the column output line 105B.

Here, each pixel may be provided with a plurality of selection switches and configured such that each pixel can be connected to any of the column output lines 105A and 105B.

Figure 10:
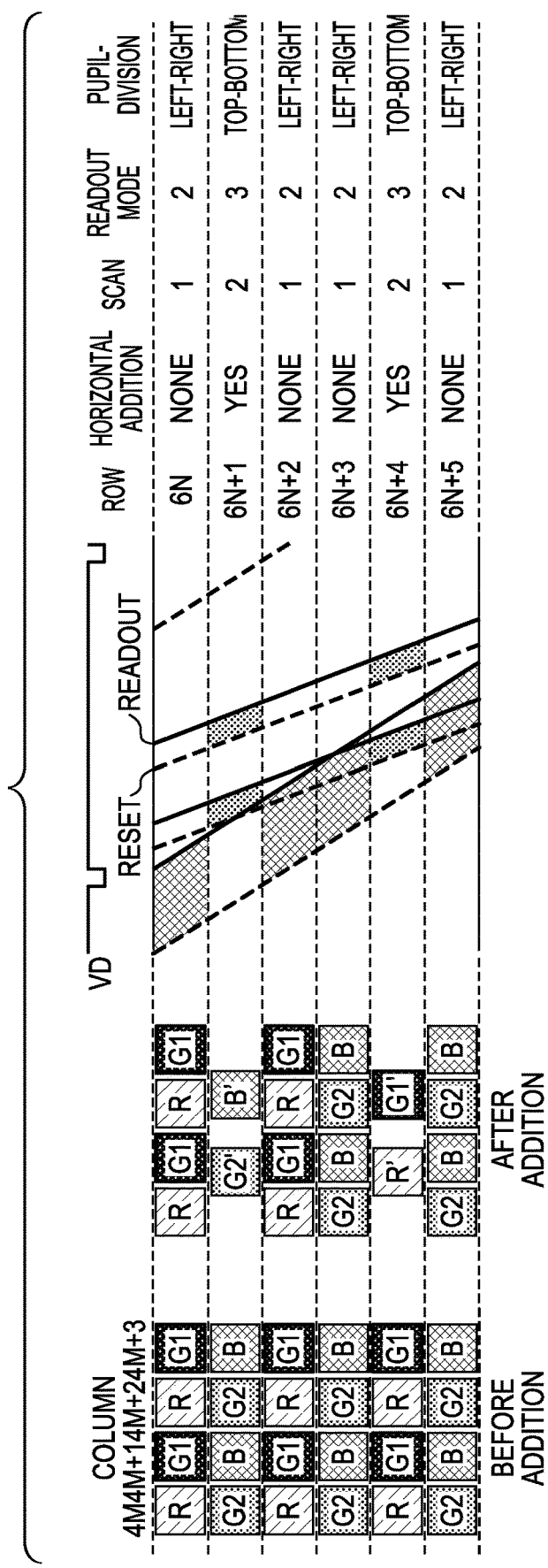
FIG. 10 is a conceptual view illustrating a vertical scan and a pupil-division direction in a second embodiment.

FIG. 10 is a conceptual view explaining relationship between a read-out scan and a pupil-division direction in a readout operation of a pixel signal in a second embodiment. In FIG. 10, six rows of pixels are illustrated as an example, and the case where a readout scan is sequentially performed in units of row is illustrated.

In FIG. 10, row numbers 6N, 6N+2, 6N+3 and 6N+5, which indicate rows for obtaining a left-right pupil-divided phase-difference signal, are referred to as a first pixel group. Row numbers 6N+1 and 6N+4, which indicate rows for obtaining a top-bottom pupil-divided phase-difference signal, are referred to as a second pixel group. Here, N represents a natural number.

In the present embodiment, signals of the first pixel group are read out via the column output line 105A in the second readout mode, and this is expressed as scan 1. Equally, signals of the second pixel group are read out via a column output line 105B in the third readout mode, and this is expressed as scan 2.

In addition, in the present embodiment, horizontal addition of pixel signals targeting on the second pixel group is performed. The left figure of FIG. 10 presents numbers of pixels before and after the horizontal addition. A G2 pixel of row 6N+1 and column 4M, and a G2 pixel of row 6N+1 and column 4M+2 included in the second pixel group are pixels with the same color, and these are horizontally added to obtain a G2' pixel. Here, M represents a natural number. When performing horizontal addition, the average value of respective pixel signals is output to the column circuit 106B by turning ON the switch 110 (see FIG. 1), and turning OFF the switch 111 (see FIG. 1). However, the method of horizontal addition and the number of pixels to be added (number of additions) are not limited thereto.

Similarly, B pixels of row 6N+1, R pixels of row 6N+4, and G1 pixels of row 6N+4 are horizontally added respectively among pixels having same colors, to obtain a B', a R' and a G1' pixels, respectively.

The middle figure of FIG. 10 illustrates a so-called slit rolling operation in which image capturing timing is predefined by a vertical synchronization signal (VD). A vertical axis of the figure indicates a row number, and a horizontal axis indicates time. Solid lines represent readout timings of target rows, and broken lines represent reset (electronic shutter) timings of target rows, and the hatched portion is corresponding to exposure time of the target rows.

Signal readout in scan 1 starts from the vertical synchronization signal VD. Reset (start of accumulation) in scan 1 is started in a preceding frame. After the start of the signal readout in scan 1, signal readout in scan 2 independently starts within predetermined time. Reset (start of accumulation) in scan 2 can be set at timing and accumulation time that are different from those in scan 1.

For example, in a 6N+3 row scanned by scan 1 and a 6N+4 row scanned by scan 2, accumulation is performed for different lengths in a same time slot, and signal readout is performed in parallel in different sequences in a same time slot. In addition, whereas scan 1 performs a one-time signal readout during a single VD, scan 2 allows a plurality of signal readouts to be performed during a single VD.

In scan 1, four out of six rows are read out in order to perform live view image capturing and focus detection in the left-right direction by the image sensor 100. On the other hand, two out of six rows are read out in scan 2 for focus detection in the top-bottom direction, prioritizing the frame rate.

As described above, in the present embodiment, scan 1 is performed with left-right pupil-division, and scan 2 is performed with top-bottom pupil-division, and thus, focus detection can be performed with both the scans. In Scan 2, pixel signals of the rows skipped in scan 1 is read out, and thus the number of readout rows is smaller than scan 1. In addition, the pixel signals of the rows read out by scan 2 are horizontally added, and thus number of pixels is smaller than in the case of non-addition. Therefore, phase-difference signals can be obtained at a high speed, and a decrease in focus detection accuracy due to a high movement speed of the subject can be suppressed.

In addition, scan 2 performs horizontal addition of the pixel signals targeting on pixels that are pupil-divided in the top-bottom direction, and therefore the pixel addition direction is different from the pupil-division direction. Accordingly, there is little effect on focus detection accuracy due to addition of pixel signals.

Phase-difference signals obtained in scan 1 and scan 2, are selectively used in accordance with characteristics of a subject. For example, signals read out in scan 1 has a higher resolution than signals read out in scan 2, and therefore focus detection of a still object can be performed with high accuracy. On the other hand, by taking advantage of high-speed readout of scan 2, scan 2 is preferable for increasing the frequency (number of times of arithmetic operations) of focus detection or detecting a moving body. As for the phase-difference signals obtained by scan 1 and scan 2, correlation operation may be performed on a same subject in a same region within an angle of view, or performed on a different subject in a different region.

An image capturing signal and a phase-difference signal read out in each of scan 1 and scan 2 are subjected to predetermined processing such as correction processing and a correlation operation by the signal processing circuit 505 and the control circuit 506. Then, the image capturing signal and the phase-difference signal are used for live view display by the operation and display circuit 509 and used for a focus adjustment operation of the imaging lens 501 via the lens driving circuit 502.

As such, the scan for each selected row is selectively used in accordance with the pupil-division direction for autofocus, and horizontal addition of pixel signals is performed targeting on pixels that are pupil-divided in the vertical direction. Accordingly, it becomes possible to suppress the subject position shift and improve focus detection accuracy, even in a case where the pupil-division is performed in the vertical direction and in a case where the subject is moving.

Third Embodiment

Figure 11:
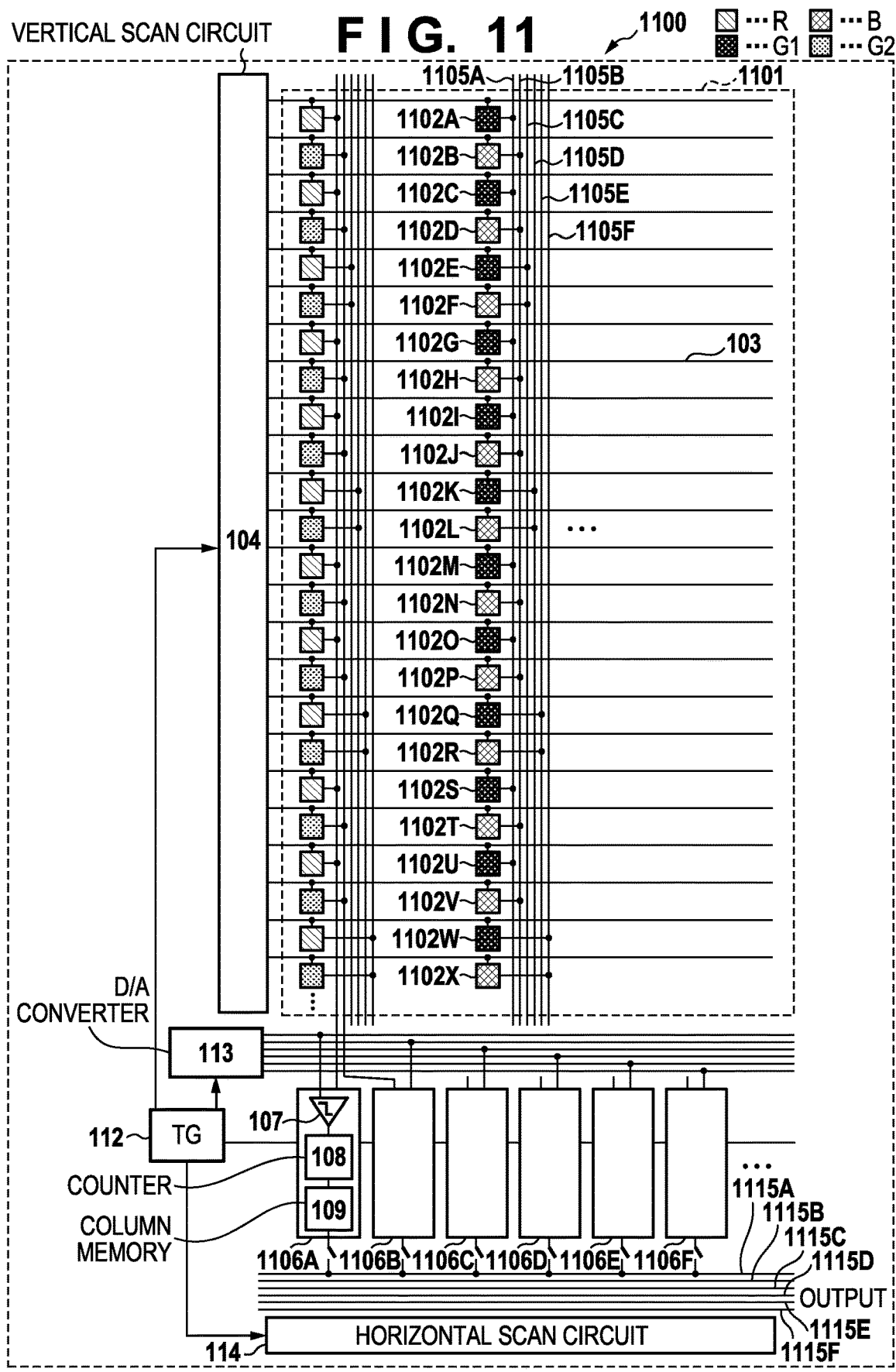
FIG. 11 is a block diagram illustrating a configuration example of pixels and peripheral circuits of an image sensor in a third embodiment.

FIG. 11 is a block diagram illustrating a configuration example of pixels and peripheral circuits of an image sensor 1100 according to a third embodiment. Explanation of components of the image sensor 1100 that are similar to those in FIG. 1 will be omitted to avoid redundancy.

In addition, six column output lines 1105 are arranged to each pixel column in the present embodiment. Although column output lines 1105C to 1105F are respectively connected to column circuits 1106C to 1106F, similarly to the column output lines 1105A and 1105 B, illustration of the wiring is omitted to avoid complexity.

Pixels 1102A, 1102C, 1102G, 11021, 1102M, 11020, 1102S and 1102U are connected to the column output line 1105A via a selection switch not illustrated, and output pixel signals to the column circuit 1106A per each row.

Pixels 1102B, 1102D, 1102H, 11021, 1102N, 1102P, 1102T and 1102V are connected to the column output line 1105B via a selection switch not illustrated, and output pixel signals to the column circuit 1106B per each row.

Pixels 1102E and 1102F are connected to the column output line 1105C via a selection switch not illustrated, and output pixel signals to the column circuit 1106C per each row.

Pixels 1102K and 1102L are connected to the column output line 1105D via a selection switch not illustrated, and output pixel signals to the column circuit 1106D per each row.

Pixels 1102Q and 1102R are connected to the column output line 1105E via a selection switch not illustrated, and output pixel signals to the column circuit 1106E per each row.

Pixels 1102W and 1102X are connected to the column output line 1105F via a selection switch not illustrated, and output pixel signals to the column circuit 1106F per each row.

Here, each pixel may be provided with a plurality of selection switches, and each pixel may be configured to be connected to all or some of the column output lines 1105A to 1105F.

Figure 12:
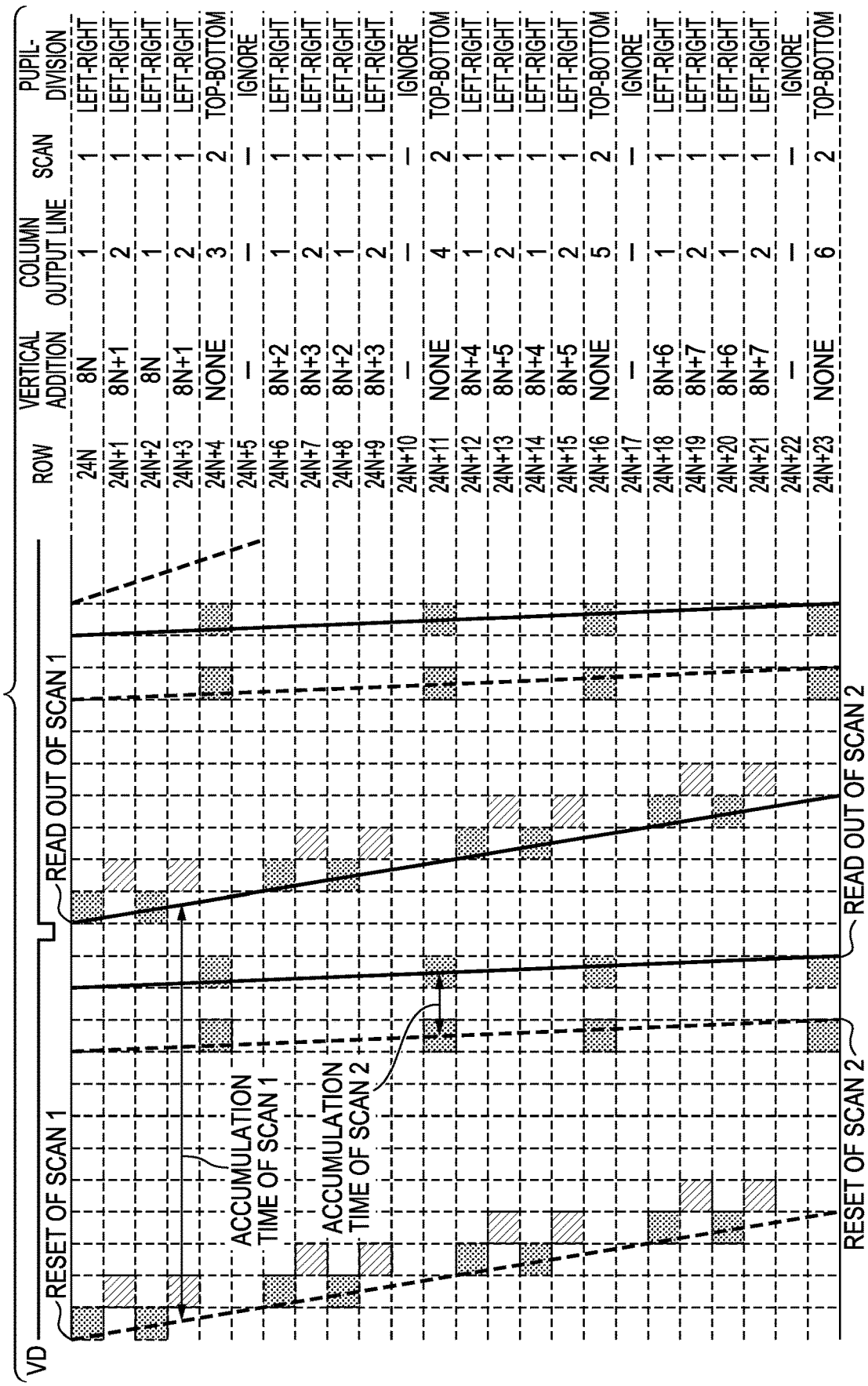
FIG. 12 is a conceptual view illustrating a vertical scan and a pupil-division direction in a third embodiment.

FIG. 12 is a conceptual view explaining relation between a readout scan and a pupil-division direction in a readout operation of pixel signals in the present embodiment. In FIG. 12, twenty four rows of pixels are illustrated as an example, and the case where a readout scan is sequentially performed in units of row is illustrated. Additionally, in FIG. 12, the column output lines 1105A to 1105F are indicated as column output lines 1 to 6.

In FIG. 12, row numbers 24N to 24N+3, 24N+6 to 24N+9, 24N+12 to 24N+15 and 24N+18 to 24N+21, which indicate rows for obtaining left-right pupil-divided phase-difference signals, are referred to as a first pixel group.

Row numbers 24N+4, 24N+11, 24N+16 and 24N+23, which indicate rows for obtaining top-bottom pupil-divided phase-difference signals, are referred to as a second pixel group.

Here, readout scan is not performed on the row numbers 24N+5, 24N+10, 24N+17 and 24N+22 in the present embodiment. Here, N represents a natural number.

In the present embodiment, signals of the first pixel group are read out via two column output lines (column output lines 1105A and 1105B) in the second readout mode, which is expressed as scan 1. Signals of the second pixel group are read out via four column output lines (column output lines 1105C, 1105D, 1105E and 1105F) in the third readout mode, which is expressed as scan 2.

In addition, pixel signals of rows having a same number of vertical additions in FIG. 12 indicate that vertical addition is performed. In other words, signals of pixels of row 24N and row 24N+2 having a number of vertical additions 8N are vertically added in the column output line 1 (column output line 1105A). Pixel signals of rows having number of vertical additions 8N+1 to 8N+7 are vertically added in a similar manner. However, the method of vertical addition and the number of pixels to be added are not limited thereto. Here, the left figure of FIG. 12 is similar to that in FIG. 9, and therefore explanation thereof will be omitted.

In scan 1, sixteen out of twenty four rows are read out and vertically added, in order to perform live view image capturing of the image capturing apparatus. Therefore, the number of rows after vertical addition becomes eight. On the other hand, four out of twenty four rows are read out in scan 2 for focus detection in the top-bottom direction, prioritizing the frame rate.

As described above, in the present embodiment, scan 1 is performed with left-right pupil-division, and scan 2 is performed with top-bottom pupil-division, and thus, focus detection can be performed with both the scans.

In scan 1, vertical addition of pixel signals targeting on pixels that are pupil-divided in the left-right direction is performed, and thus, image capturing signals and phase-difference signals can be obtained at a high speed. In addition, since the addition direction of pixel signals is different from the pupil-division direction, it is possible to obtain phase-difference signals while suppressing decrease of focus detection accuracy due to pixel addition. In addition, in scan 2, pixel signals of a part of the rows skipped in scan 1 is read out, the number of readout rows is smaller than scan 1, and readout is performed by using a plurality of column output lines, and thus a phase-difference signal can be obtained at a high speed.

An image capturing signal and a phase-difference signal read out in each of scan 1 and scan 2 are subjected to predetermined processing such as correction processing and a correlation operation by the signal processing circuit 505 and the control circuit 506. Then, the image capturing signal and the phase-difference signal are used for live view display by the operation and display circuit 509 and used for a focus adjustment operation of the imaging lens 501 via the lens driving circuit 502.

As such, the scan for each selected row is selectively used in accordance with the pupil-division direction for autofocus, and pixels that are pupil-divided in the vertical direction are read out via a plurality of column output lines, and thus, it becomes possible to suppress the subject position shift and improve focus detection accuracy, even in a case where the pupil-division is performed in the vertical direction and in a case where the subject is moving.

Here, scan 1 and scan 2 in the first to third embodiments allows for reducing power consumption, during blanking, by saving power of circuits such as the column circuits 106 or 1106 involved in each scan.

In addition, the operations described in the aforementioned embodiments are selectively used in accordance with the properties of the subject and various modes of the image capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-203606, filed Dec. 15, 2021, which is hereby incorporated by reference herein in its entirety.

What is claimed is:

1. An image sensor comprising a pixel array in which pixels are arranged in a matrix form, wherein
  phase-difference signals in a horizontal direction are output from a first pixel group of the pixel array via a first signal output line, and phase-difference signals in a vertical direction are output from a second pixel group, which is different from the first pixel group of the pixel array, via a second signal output line, and
  number of pixels of the phase-difference signals in the horizontal direction output via the first signal output line and number of pixels of the phase-difference signals in the vertical direction output via the second signal output line are different,
  wherein a plurality of column output lines including first column output lines and second column output lines are respectively arranged for each one column of the pixels, and the number of the second column output lines is larger than the number of the first column output lines.

2. The image sensor according to claim 1, wherein number of pixels in a column direction of the phase-difference signals in the horizontal direction and number of pixels in a column direction of the phase-difference signals in the vertical direction are different.

3. The image sensor according to claim 1, wherein number of pixels in a row direction of the phase-difference signals in the horizontal direction and number of pixels in a row direction of the phase-difference signals in the vertical direction are different.

4. The image sensor according to claim 1, wherein addition number of pixels of the phase-difference signals in the horizontal direction and addition number of pixels of the phase-difference signals in the vertical direction are different.

5. The image sensor according to claim 1, wherein an addition direction of pixels of the phase-difference signals in the horizontal direction and an addition direction of pixels of the phase-difference signals in the vertical direction are different.

6. The image sensor according to claim 1, further configured to output an image capturing signal.

7. An image capturing apparatus comprising:
the image sensor according to claim 1; and
a control circuit configured to perform focus control of a lens based on the phase-difference signals in the horizontal direction or in the vertical direction output from the image sensor.

8. An image sensor comprising a pixel array in which pixels are arranged in a matrix form, wherein
phase-difference signals in a horizontal direction are output from a first pixel group of the pixel array via a first signal output line, and phase-difference signals in a vertical direction are output from a second pixel group, which is different from the first pixel group of the pixel array, via a second signal output line, and
addition number of pixels of the phase-difference signals in the horizontal direction output via the first signal output line and addition number of pixels of the phase-difference signals in the vertical direction output via the second signal output line are different,
wherein a plurality of column output lines including first column output lines and second column output lines are respectively arranged for each one column of the pixels, and the number of the second column output lines is larger than the number of the first column output lines.

9. The image sensor according to claim 8, wherein addition number of pixels in a column direction of the phase-difference signals in the horizontal direction and addition number of pixels in a column direction of the phase-difference signals in the vertical direction are different.

10. The image sensor according to claim 8, wherein addition number of pixels in a row direction of the phase-difference signals in the horizontal direction and number of pixels in a row direction of the phase-difference signals in the vertical direction are different.

11. The image sensor according to claim 8, wherein an addition direction of pixels of the phase-difference signals in the horizontal direction and an addition direction of pixels of the phase-difference signals in the vertical direction are different.

12. The image sensor according to claim 8, further configured to output an image capturing signal.

13. An image capturing apparatus comprising:
the image sensor according to claim 8; and
a control circuit configured to perform lens focus control, based on the phase-difference signals in the horizontal direction or in the vertical direction output from the image sensor.

* * * * *